(12) United States Patent
Neyland et al.

(10) Patent No.: US 12,513,016 B2
(45) Date of Patent: Dec. 30, 2025

(54) ELECTRONIC SUBSYSTEM HAVING MULTIPLE POWERED DEVICES PRIORITIZED FOR PROVIDING POWER TO THE SUBSYSTEM

(71) Applicant: Outdoor Wireless Networks LLC, Richardson, TX (US)

(72) Inventors: Erik Neyland, Bolton, MA (US); Dan Yi, Hudson, NH (US); Gary L. Falk, Sudbury, MA (US)

(73) Assignee: Outdoor Wireless Networks LLC, Richardson, TX (US)

( * ) Notice: Subject to any disclaimer, the term of this patent is extended or adjusted under 35 U.S.C. 154(b) by 175 days.

(21) Appl. No.: 18/298,186

(22) Filed: Apr. 10, 2023

(65) Prior Publication Data
US 2023/0261889 A1  Aug. 17, 2023

Related U.S. Application Data

(62) Division of application No. 16/969,464, filed as application No. PCT/US2019/017712 on Feb. 12, 2019, now Pat. No. 11,627,005.
(Continued)

(51) Int. Cl.
| | |
|---|---|
| *G06F 1/28* | (2006.01) |
| *G06F 1/3287* | (2019.01) |
| *G06F 1/3296* | (2019.01) |
| *G06F 11/30* | (2006.01) |
| *H04B 7/0426* | (2017.01) |

(Continued)

(52) U.S. Cl.
CPC ............... *H04L 12/10* (2013.01); *G06F 1/28* (2013.01); *G06F 1/3287* (2013.01); *G06F 1/3296* (2013.01); *G06F 11/3058* (2013.01); *H04B 7/0426* (2013.01); *H04L 12/12* (2013.01); *H04L 12/40045* (2013.01)

(58) Field of Classification Search
CPC ... H04L 12/10; H04L 12/12; H04L 12/40045; G06F 1/28; G06F 1/3287; G06F 1/3296; G06F 11/3058; H04B 7/0426
See application file for complete search history.

(56) References Cited

U.S. PATENT DOCUMENTS

| | | |
|---|---|---|
| 8,499,177 B2 | 7/2013 | Balasubramanian et al. |
| 9,535,437 B1 | 1/2017 | Dwelley et al. |

(Continued)

FOREIGN PATENT DOCUMENTS

| | | |
|---|---|---|
| EP | 2980952 A1 | 2/2016 |

OTHER PUBLICATIONS

European Patent Office, "European Search Report from EP Application No. 19752005.9" Oct. 7, 2021, pp. 1 through 7, Published in EP.

(Continued)

*Primary Examiner* — Zahid Choudhury
(74) *Attorney, Agent, or Firm* — Fogg & Powers LLC

(57) ABSTRACT

In an embodiment, a method includes receiving power signals at respective powered devices of a subsystem. The method further includes coupling, to a power supply with one of the powered devices having a highest priority, one of the power signals received by the one of the powered devices having a highest priority. The method further includes generating a supply signal with the power supply in response to the one of the power signals.

20 Claims, 6 Drawing Sheets

Related U.S. Application Data

(60) Provisional application No. 62/629,638, filed on Feb. 12, 2018.

(51) Int. Cl.
*H04L 12/10* (2006.01)
*H04L 12/12* (2006.01)
*H04L 12/40* (2006.01)

(56) References Cited

U.S. PATENT DOCUMENTS

| | | |
|---|---|---|
| 2008/0168283 A1 | 7/2008 | Penning |
| 2010/0007334 A1* | 1/2010 | Apfel ................. H04L 12/10 |
| | | 324/123 R |
| 2010/0079005 A1 | 4/2010 | Hyde et al. |
| 2011/0125341 A1 | 5/2011 | Heath et al. |
| 2012/0074788 A1* | 3/2012 | Carter ................. H02J 9/06 |
| | | 307/80 |
| 2013/0144448 A1* | 6/2013 | Luerkens ............. G06F 1/266 |
| | | 700/286 |
| 2015/0019884 A1* | 1/2015 | Huff .................. H04L 12/10 |
| | | 713/300 |
| 2015/0032280 A1* | 1/2015 | Kim ............... H02J 13/00002 |
| | | 700/297 |
| 2015/0205336 A1 | 7/2015 | Walker |
| 2016/0001660 A1 | 1/2016 | Tomura et al. |
| 2017/0115719 A1 | 4/2017 | Hunter, Jr. et al. |
| 2018/0167223 A1* | 6/2018 | Pratap ................. H04L 12/10 |
| 2018/0241578 A1* | 8/2018 | Upadhyaya ........... H04L 12/40 |
| 2019/0044369 A1* | 2/2019 | Lin ..................... H02J 9/06 |
| 2019/0081556 A1* | 3/2019 | Patel .................. H04L 12/10 |
| 2019/0227608 A1* | 7/2019 | Chen ................... G06F 1/30 |
| 2021/0006420 A1 | 1/2021 | Neyland et al. |
| 2023/0112153 A1* | 4/2023 | Barany ................ H04L 12/10 |
| | | 375/257 |

OTHER PUBLICATIONS

International Bureau, "International Preliminary Report on Patentability from PCT Application No. PCT/US2019/017712", from Foreign Counterpart to U.S. Appl. No. 16/969,464, filed Aug. 27, 2020, pp. 1 through 10, Published: WO.

International Searching Authority, "International Search Report and Written Opinion from PCT Application No. PCT/US2019/017712", May 28, 2019, pp. 1 through 13, Published: WO.

Linear Technology, "IEEE 802.3bt PD Interface Controller" LT4294, Apr. 2017, pp. 1 through 14, Published in US.

Linear Technology, "IEEE 802.3bt PD Interface with Forward/Flyback Controller" LT4295, Aug. 2016, pp. 1 through 28, Published in US.

U.S. Patent and Trademark Office, "Final Office Action", U.S. Appl. No. 16/969,464, Aug. 26, 2022, pp. 1 through 13, Published: US.

U.S. Patent and Trademark Office, "Notice of Allowance", U.S. Appl. No. 16/969,464, Dec. 7, 2022, pp. 1 through 7, Published: US.

U.S. Patent and Trademark Office, "Office Action", U.S. Appl. No. 16/969,464, Nov. 15, 2021, pp. 1 through 21, Published: US.

* cited by examiner

ELECTRONIC SUBSYSTEM HAVING MULTIPLE POWERED DEVICES PRIORITIZED FOR PROVIDING POWER TO THE SUBSYSTEM

CROSS-REFERENCE TO RELATED APPLICATION

This application is a divisional of U.S. application Ser. No. 16/969,464 filed on Aug. 12, 2020, and titled "ELECTRONIC SUBSYSTEM HAVING MULTIPLE POWERED DEVICES PRIORITIZED FOR PROVIDING POWER TO THE SUBSYSTEM," which is a 371 National Stage of PCT Application No. PCT/US2019/017712, filed on Feb. 12, 2019, and titled "ELECTRONIC SUBSYSTEM HAVING MULTIPLE POWERED DEVICES PRIORITIZED FOR PROVIDING POWER TO THE SUBSYSTEM," which claims benefit of U.S. Provisional Application No. 62/629,638, filed on Feb. 12, 2018, and titled "ELECTRONIC SUBSYSTEM HAVING MULTIPLE POWERED DEVICES PRIORITIZED FOR PROVIDING POWER TO THE SUBSYSTEM," the contents of all of which are incorporated herein in their entireties.

SUMMARY

FIG. 1 is a diagram of a system 10, which includes a host 12, power source equipment (PSE) 14, a signal combiner 16, and an electronic subsystem 18, which is peripheral to the host and which includes a Power-Over-Ethernet (PoE)-enabled Powered Device (PD) 20 coupled to the signal combiner via an Ethernet cable 22. The signal combiner 16 is configured to superimpose a data signal from the host 12 on a power signal from the PSE 14, and to provide this combined data/power signal to the Ethernet cable 22. The PD 20 is configured to receive, from the Ethernet cable 22, the combined data/power signal, to extract the power signal from the combined data/power signal, and to provide the extracted power signal to a power supply 24 onboard the subsystem 18 according to the Power-Over-Ethernet (PoE) standard governed by IEEE 802.3bt. For example, the PD 20 can include a rectifier circuit configured to extract the power signal by converting the combined data/power signal from an AC signal to an extracted DC power signal as described on p. 14 of Appendix A (Appendix A is described below). The power supply 24 is configured to convert the power signal into a regulated supply signal for powering circuitry and other components of the subsystem 18. As long as the subsystem 18 receives sufficient power from the PSE 14, the subsystem can operate without a power-supply connection (e.g., AC adapter, battery) that is separate from the cable 22.

For example, the host 12 can be, or can be part of, a master unit of a distributed antenna system (DAS), the subsystem 18 can be a remote unit of the DAS, and the PSE 14 can be a power supply that is part of the host, otherwise part of the master unit, or separate from both the host and the master unit.

Typically, multiple PoE-enabled PDs 20 do not receive power from a common PSE 14, and multiple PSEs do not source power to a single PoE-enabled PD; that is, there is typically a one-to-one correspondence between the PSEs and the PoE-enabled PDs in a system such as the system 10. A reason for the former is to prevent contention between multiple PoE-enabled PDs attempting to negotiate with a single PSE, and a reason for the latter is to prevent contention between multiple PSEs attempting to negotiate with a single PoE-enabled PD.

Furthermore, the subsystem 18 typically includes only a single PoE-enabled PDs 20; if the subsystem were to include multiple PoE-enabled PDs that are each coupled to a respective PSE 14, then this could lead to contention as to which PSE provides power to the subsystem. And even without such contention, multiple PoE-enabled PDs 20 providing power to the subsystem 18 can cause problems such as unbalancing of the power provided by each PD.

A possible solution to the problem of the subsystem 18 having multiple PoE-enabled PDs 20 is to enable only one of the PoE-enabled PDs for providing power to the subsystem. For example, if a subsystem 18 includes a 1000BASE-T (1 GHz) PoE-enabled PD 20 and a 2.5 GHz/5 GHz/10 GHz NBASE-T PoE-enabled PD 20, then the manufacture of the subsystem can select only one of the PDs for providing power to the subsystem.

But a problem with this solution is that because it may be unknown beforehand which PoE-enabled PD 20 a user of the subsystem 18 will use in his/her installation/system, the subsystem may be unable to receive power via the selected PoE-enabled PD 20. For example, if only the 1000BASE-T PoE-enabled PD 20 of a subsystem 18 is populated, and only the 2.5 GHz/5 GHz/10 GHz NBASE-T port connected contains a PSE 14, then the subsystem 18 will be unable to receive power via an Ethernet connection.

A possible solution to this problem of only one PoE-enabled PD 20 being selected is for a manufacturer of the subsystem 18 to make a number of different versions of the subsystem in which different ones of the PoE-enabled PDs 20 are selected. For example, a first version of the subsystem 18 may have only the 1000BASE-T PD 20 selected, and a second version of the subsystem may have only the 2.5 GHz/5 GHz/10 GHz NBASE-T PD 20 selected.

But problems with this solution include the increased costs and complexities associated with manufacturing multiple versions of the same subsystem 18, and, during installation of the system 10, increased user confusion as to the version of a particular subsystem or where to use what subsystem version, and the inability for the user to swap any one subsystem for any other subsystem.

Therefore, a need has arisen for a PD interface circuit that can solve one or more of the above-described problems.

An embodiment of such a PD interface circuit includes first and second PoE-enabled PDs. The first PD is configured to receive power from a connected PSE, and to couple to a power supply onboard the subsystem. The second PD is configured to receive a second power signal from a second PSE. If active, it supplies power to the on board DC-DC power supply, and prevents the first PD from suppling power to the DC-DC power supply.

For example, such a PD interface circuit is configured to impart a priority to each PoE-enabled PD such that if two PDs receive power from respective PSEs, then only the PD having the higher priority is enabled to couple a corresponding PSE power signal to the power supply onboard the subsystem.

DETAILED DESCRIPTION

"Approximately," "substantially," and similar words, as used herein, indicate that a given quantity b can be within a range b±10% of b, or b±1 if |10% of b|<1.

Figure 2:
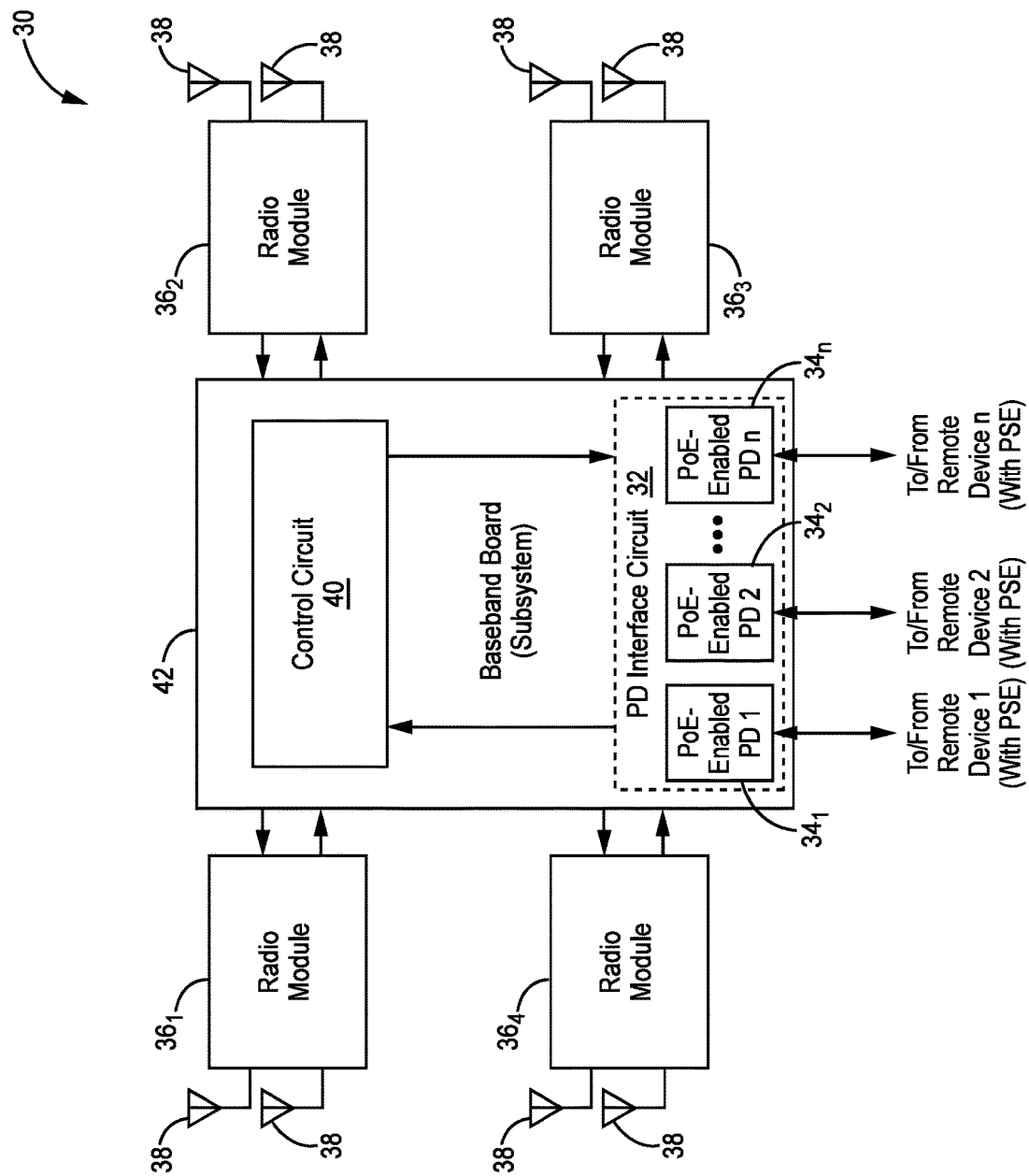
FIG. 2 is a diagram of a subsystem that is configured to prioritize PoE-enabled PDs such that no more than one of the PDs provides power to the subsystem at any one time, according to an embodiment.

FIG. 2 is diagram of a subsystem 30, which includes a PD interface circuit 32 having PoE-enabled PDs $34_1$-$34_n$, prioritized so that no more than one of the PDs provides power to the subsystem at any given time, according to an embodiment. Although, for purposes of explanation, the subsystem 30 is described as being a remote transmit/receive module of a distributed antenna system (DAS), it is understood that the subsystem can be another type of subsystem.

In addition to the interface circuit 32, the subsystem 30 includes four 2×2 multiple-input-multiple-output (MIMO) radio modules $36_1$-$36_4$, transmit/receive antennas 38, a control circuit 40, and a board 42 to which the interface circuit and control circuit are mounted, and to which the radio modules are attached via respective connectors.

The interface circuit 32 is configured to prioritize the PoE-enabled PDs $34_1$-$34_n$ such that even if multiple PSEs are connected to more than one of the Ethernet ports and associated PD Controller, only the PSE-connected PD with the highest priority is configured to provide power to the subsystem 30. The PoE-enabled PDs 34 are power prioritized in order such that the PD $34_1$ has the highest power priority and the PD $34_n$ has the lowest power priority. For example, if a first PSE is coupled to the PD $34_1$ and a second PSE is coupled to the PD $34_2$, then the interface circuit 32 is configured to disable the power-coupling ability of the lower-priority PD $34_2$ such that only the higher-priority PD $34_1$ couples power from the first PSE to the subsystem 30. That is, even though the second PSE is providing, via the combiner 16 and cable 22 (FIG. 1), a second power signal to the PoE-enabled PD $34_2$, the interface circuit 32 is configured to prevent this lower-priority PD (i.e., the PD $34_2$) from coupling the second power signal to a power supply (not shown in FIG. 2) onboard the subsystem 30. In a similar example, if a first PSE is coupled to the PD $34_2$ and a second PSE is coupled to the PD $34_n$, then the interface circuit 32 is configured to disable the power-coupling ability of the lower-priority PD $34_n$ such that only the higher-priority PD $34_2$ couples power from the first PSE to the subsystem 30. That is, even though the second PSE is providing, via the combiner 16 and cable 22, a second power signal to the PoE-enabled PD $34_n$, the interface circuit 32 is configured to prevent this lower-priority PD (i.e., the PD $34_n$) from coupling the second power signal to the power supply onboard the subsystem 30. And in yet another similar example, if a first PSE is coupled to the PD $34_1$, a second PSE is coupled to the PD $34_2$, and a third PSE is coupled to the PD $34_n$, then the interface circuit 32 is configured to disable the power-coupling abilities of the lower-priority PDs $34_2$ and $34_n$, such that only the higher-priority PD $34_1$ couples power from the first PSE to the subsystem 30. That is, even though the second and third PSEs are providing, via respective combiners 16 and respective cables 22, respective second and third power signals to the PoE-enabled PDs $34_2$ and $34_n$, the interface circuit 32 is configured to prevent these lower-priority PDs (i.e., the PDs $34_2$ and $34_n$) from coupling these respective power signals to the power supply onboard the subsystem 30.

Furthermore, the interface circuit 32 is configured to hot-swap the PoE-PDs $34_1$-$34_n$ such that if a PSE connected to one of the PDs stops sourcing power (e.g., due to a failure of the PSE or of the PoE-enabled PD) to the subsystem 30, then the interface circuit enables the next-highest-priority PoE-enabled PD 34 that is coupled to another PSE to source power to the power supply (not shown in FIG. 2) onboard the subsystem 30. For example, as described above, if a first PSE is coupled to the PD $34_1$ and a second PSE is coupled to the PD $34_2$, then the interface circuit 32 is configured to disable the power-coupling ability of the lower-priority PD $34_2$ such that only the higher-priority PD $34_1$ couples a first power signal from the first PSE to the subsystem 30. If the first PSE stops providing power to the PD $34_1$, then the interface circuit 32 is configured to enable the next-highest-priority PD $34_2$ coupled to another PSE to power the subsystem 30 while preventing the lower-priority PDs $34_3$-$34_n$ from powering the subsystem 30. The subsystem can include an external auxiliary power supply if available that is configured to provide power to the subsystem while no PSE is powering the subsystem. The auxiliary power input is the highest priority input. If the first PSE, from the previous example, begins to provide power to the PD $34_1$, then the interface circuit 32 can be configured to re-enable the higher-priority PD $34_1$ to power the subsystem 30 after disabling the lower-priority PD $34_2$ from powering the subsystem. Further to this example, if the PSE coupled to the higher-priority PD $34_1$ stops providing power to the subsystem 30 and there is no PSE coupled to any of the PDs $34_2$-$34_{n-1}$, then the interface circuit 32 is configured to enable the lowest-priority PD $34_n$ to couple the $n^{th}$ power signal from the $n^{th}$ PSE to the onboard power supply, and to disable the PD $34_1$ from providing power to the subsystem. If the first PSE thereafter begins to provide a power signal to the PD $34_1$, then the interface circuit 32 can be configured to re-enable the higher-priority PD $34_1$ to provide the power signal to the onboard power supply after disabling the lowest-priority PD $34_n$ from powering the subsystem 30.

The interface circuit 32 is further described below in conjunction with FIGS. 3-5.

Still referring to FIG. 2, each of the radio modules $36_1$-$36_4$ is configured to transmit and receive signals on one or more respective frequency bands, and, therefore, is configured to allow one or more electronic devices (e.g., computers, smart phones, Internet-Of-Things (IoT) devices) to communicate with a communications network of a physical structure (e.g., building, stadium) within which the subsystem 30 is installed. For example, each radio module 36 is configured to transmit and receive signals on one or more frequency bands within the approximate frequency range of 0.3 GHz-60 GHz. One or more of the radio modules 36 can be configured to transmit and receive signals on a cell-phone frequency band such that the one or more radio modules act like a cell tower so that people inside of the structure can make voice calls, and can download and upload data, over a cellular network to which the structure's communication network is coupled. And one or more of the radio modules 36 can be configured to transmit and receive signals on an IEEE 802.11 frequency band so that people inside of the structure can connect their wireless-enabled devices (e.g., smart phone, tablet, laptop, computer) to the internet via the structure's communication network.

Each of the antennas 38 can be any type of antenna that is suitable for transmitting and receiving signals over the one or more frequency bands for which the corresponding radio module 36 is configured.

The control circuit 40 is configured to control the configurations and operations of the interface circuit 32, the radio modules 36, the onboard power supply (not shown in FIG. 2), and other components onboard the subsystem 30. As further described below in conjunction with FIGS. 3-5, the control circuit 40 is adapted to configure the subsystem 30 to have a power consumption that is no more than the maximum power output of the PSE that provides power to the subsystem via a respective one of the PoE-enabled PDs 34. For example, if the maximum power output from the connected PSE is 25 Watts (W) and the maximum power consumption of the subsystem 30 is 40 W with all radio modules 36 operating at maximum power levels, then the control circuit 40 can be configured to disable one or two of the radio modules, or to reduce the frequency of the control circuit's clock signal, so that the maximum power consumption of the subsystem is less than or equal to 25 W. Operation of the control circuit 40 in this regard is further described below in conjunction with FIGS. 3-5. Furthermore, the control circuit 40 can be, or can include, any suitable circuitry such as a microprocessor, a microcontroller, or a field-programmable gate array (FPGA), and can include embedded or external memory configured to store program instructions or configuration data.

And the board 42 can be any suitable type of printed circuit board.

Still referring to FIG. 2, operation of the subsystem 30 is described, according to an embodiment.

Figure 1:
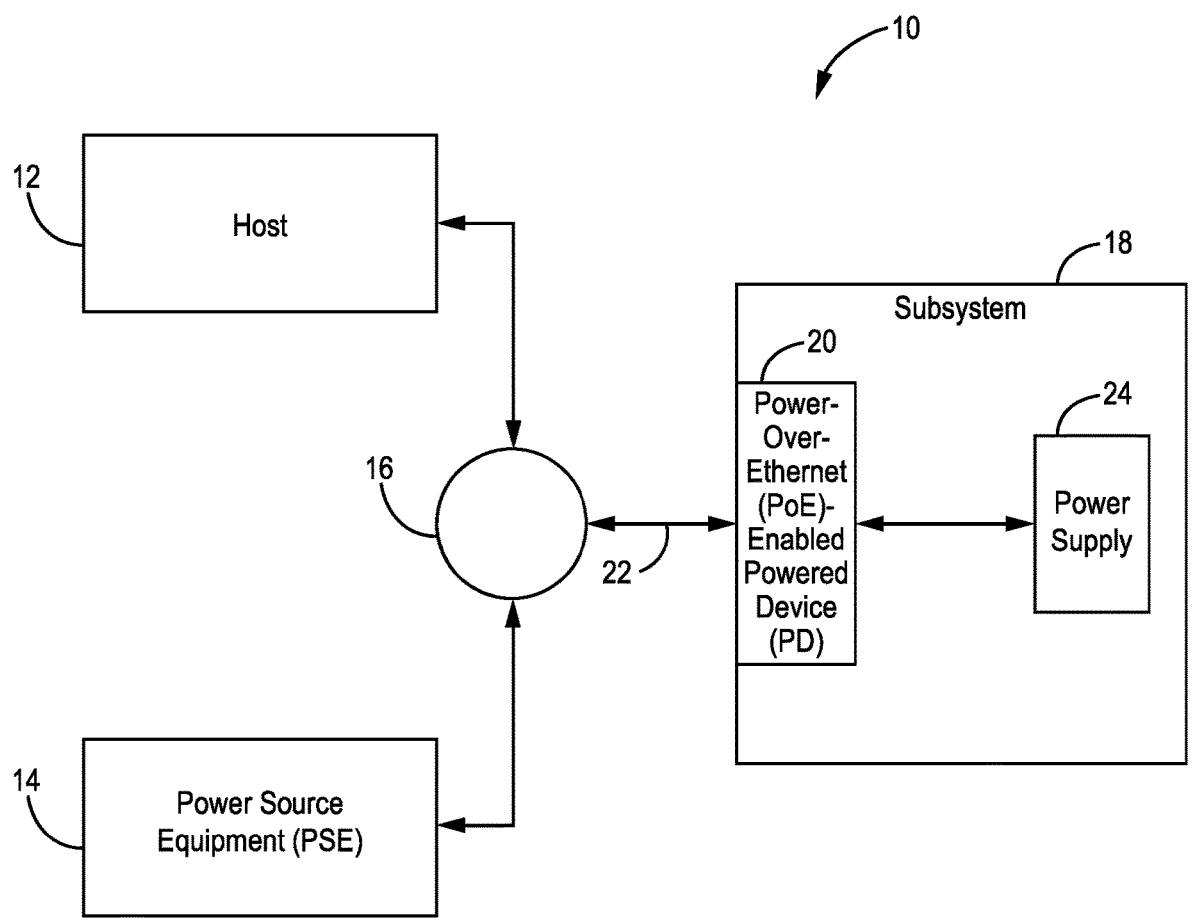
FIG. 1 is a diagram of a system in which a subsystem is configured to receive power from power source equipment (PSE) via a Power-over-Ethernet (PoE)-enabled Powered Device (PD) in accordance with the IEEE 802.3bt standard.

During an initialization period, the interface circuit 32 first determines which PoE-enabled PDs 34 are coupled to PSEs 14 (FIG. 1). The interface circuit 32 determines which PoE-enabled PDs 34 are coupled to PSEs while receiving power from at least one of the PSEs during the handshaking PoE process.

Next, the interface circuit 32 enables the highest-priority PoE-enabled PD 34 that is also connected to a PSE 14 (FIG. 1) to couple the extracted power signal to an onboard power supply (not shown in FIG. 2), which generates one or more necessary regulated supply signals in response to the extracted power signal. The one or more regulated supply signals power the components of the subsystem 30, including the interface circuit 32 and the control circuit 40.

During this process the control circuit 40 determines the maximum power capability of the connected PSE 14 (FIG. 1), and, if warranted, reconfigures the subsystem 30 to have a maximum power consumption that is no greater than the maximum power capability of the connected PSE.

Next, the control circuit 40 enables the configured subsystem 30 for operation.

If, at some later time, the connected PSE 14 (FIG. 1) stops providing power to the subsystem 30, then the interface circuit 32 enables the next-highest-priority PoE-enabled PD 34 that is coupled to another PSE to couple the power signal from the other PSE to the onboard power supply (not shown in FIG. 2).

Still referring to FIG. 2, alternate embodiments of the subsystem 30 are contemplated. For example, the subsystem 30 can be other than a remote unit of a DAS. Furthermore, the subsystem 30 may omit some of the above-described components, and may include components not described. Moreover, one or more of the radio modules may be other than a 2×2 MIMO module. In addition, the PoE-enabled PDs 34 need not be physically arranged on the board 42 in the order of their priorities. Furthermore, alternate embodiments described in conjunction with FIGS. 1 and 3-6 may be applicable to the interface circuit 32.

Figure 3:
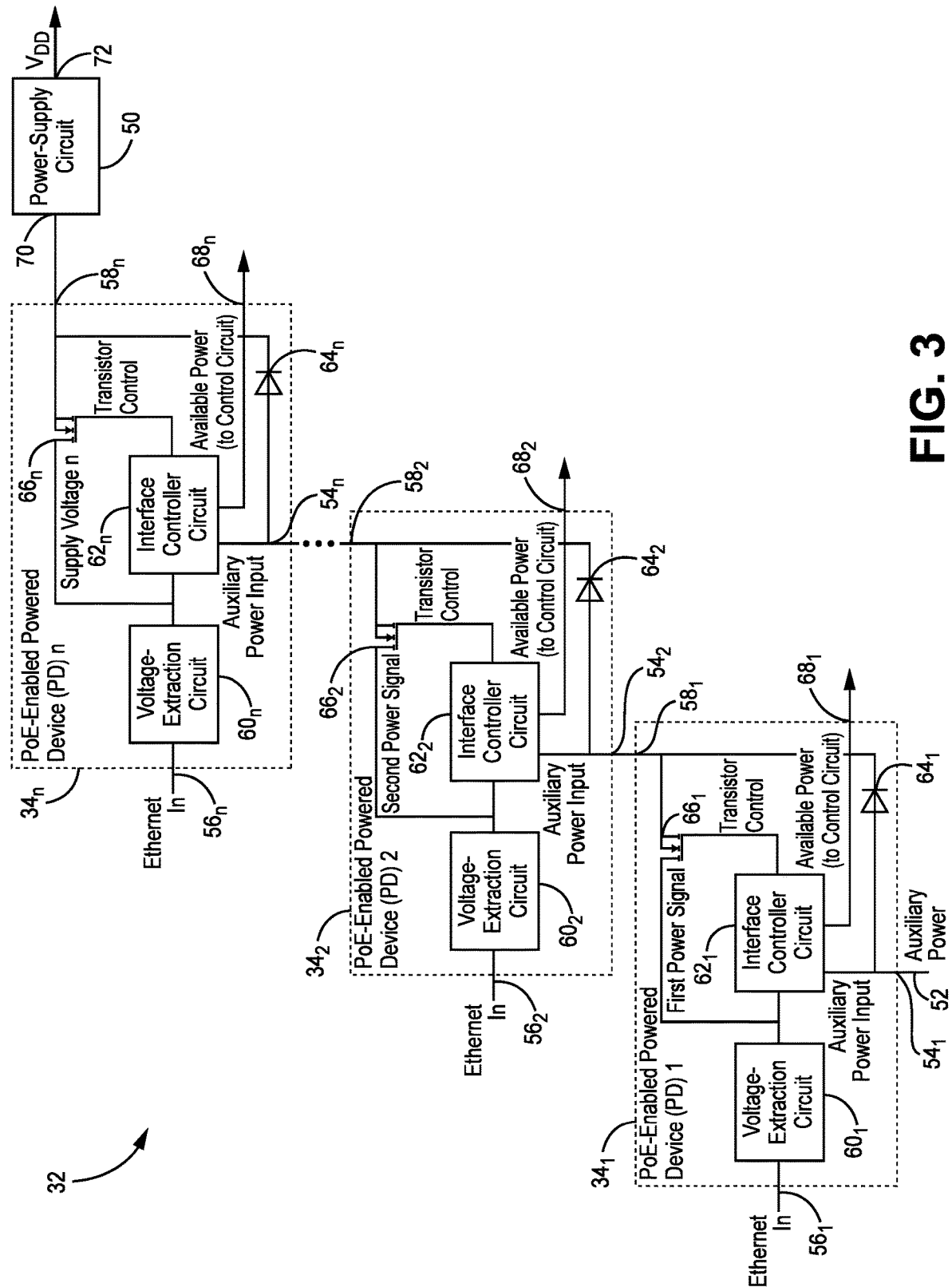
FIG. 3 is a diagram of the PD interface circuit of FIG. 2, according to an embodiment.

FIG. 3 is a diagram of the interface circuit 32 of FIG. 2 and of a power-supply circuit 50, according to an embodiment. In addition to the PoE-enabled Powered Devices (PDs) $34_1$-$34_n$, the interface circuit 32 includes an auxiliary-power terminal 52, which takes priority over the PDs as described below. Furthermore, the power-supply circuit 50 can be any suitable power supply such as a buck converter, boost converter, buck-boost converter, or flyback converter.

The highest-priority PoE-enabled PD $34_1$ includes an auxiliary-power input node $54_1$, one or more Ethernet nodes $56_1$ (hereinafter "node"), a power-signal output node $58_1$, voltage-extraction circuit $60_1$, an interface controller circuit $62_1$, a diode $64_1$, a transistor $66_1$, and an available-power node $68_1$.

The auxiliary-power input node $54_1$ is coupled to the auxiliary-power terminal 52, and is configured to receive, and to couple to the power-signal output node $58_1$, an auxiliary power signal provided by a non-PSE source that is off board the subsystem 30 (FIG. 2).

The Ethernet node $56_1$ is configured to receive, from a first combiner 16 (FIG. 1), a combined signal that includes a first input data signal and a first power signal superimposed on one another as described above in conjunction with FIG. 1, and is configured to transmit a first output data signal from the subsystem 30 (FIG. 2) to a first remote host 12 (FIG. 1). As described above in conjunction with FIG. 1, the first remote the host 12 is configured to generate the first input data signal, and a first remote PSE 14 (FIG. 1) is configured to generate the first power signal.

The power-signal output node $58_1$ is configured to provide a first power signal extracted from the combined signal on the Ethernet node $56_1$ to the next-highest-priority PoE-enabled PD $34_2$. The power goes to the auxiliary port of $34_2$ causing the controller to use the higher-priority power instead of its own power sourced from its associated PSE.

The voltage-extraction circuitry $60_1$ is configured to extract the first power signal from the combined signal received on the Ethernet node $56_1$, and to couple the extracted first power signal to an input conduction node of the transistor $66_1$. The voltage-extraction circuitry $60_1$ can be any circuitry suitable to extract the first power signal from the combined signal; an example of the voltage-extraction circuitry is shown on p. 11 of the data sheet (version 4294f) for the LT4294 IEEE 802.3bt PD Interface Controller, which data sheet is included as Appendix A below.

The interface controller circuit $62_1$ is configured to control the transistor $66_1$ to couple the extracted power signal from the voltage-extraction circuit $60_1$ to the power-signal output node $58_1$ in response to the signal on the Ethernet input node $56_1$ including the power signal from a PSE and there being no voltage on the auxiliary-power input node $54_1$.

Furthermore, the interface controller circuit $62_1$ is configured to control the transistor $66_1$ to forward the voltage from circuit $60_1$ to the power-signal output node $58_1$ in response to the signal on the Ethernet input node $56_1$ having a PSE sourcing a power signal, or there being an auxiliary-power voltage on the auxiliary-power terminal 52 and the auxiliary-power node $54_1$.

And the interface controller $62_1$ is configured to provide, to the control circuit 40 (FIG. 2), a signal that represents the available power, e.g., the maximum power, that the PSE 14 (FIG. 1) is configured to provide to the subsystem 30 (FIG. 2) via the associated PSE.

The diode 64$_1$ includes an anode coupled to the auxiliary-power input node 54$_1$ and a cathode coupled to the power-signal output node 58$_1$. In response to an auxiliary voltage on the auxiliary terminal 52 and auxiliary-power input node 54$_1$, the diode 64$_1$ is configured to couple the auxiliary voltage to the power-signal output node 58$_1$, and in response to a lack of the auxiliary voltage and a presence of the extracted first power signal on the power-signal output node, the diode is configured to uncouple the auxiliary-power input node from the first power signal. Although shown as a PN diode, the diode 64 can be formed by a diode-connected transistor or another diode-emulating circuit.

And the transistor 66$_1$ includes the first conduction node coupled to receive the extracted first power signal from the voltage-extraction circuit 60$_1$, a second conduction node coupled to the power-signal output node 58$_1$ and to the cathode of the diode 64$_1$, and a control node coupled to the interface controller 62$_1$. In response to an "on" signal (e.g., a logic-high voltage) from the interface controller 62$_1$, the transistor 66$_1$ is configured to couple the extracted first power signal to the power-signal output node 58$_1$, and in response to an "off" signal (e.g., a logic-low signal) from the interface controller, the transistor is configured to uncouple the voltage-extraction circuit 60$_1$, and, if present, the extracted first power signal, from the power-signal output node. Although described as being an NMOS transistor, the transistor 66$_1$ can be any suitable type of transistor.

The next-highest-priority PoE-enabled PD 34$_2$ includes an auxiliary-power input node 54$_2$ coupled to the power-output node 58$_1$ of the PoE-enabled PD 34$_1$, includes one Ethernet node 56$_2$ (hereinafter "node") configured to receive a combined signal include a second power signal, and is otherwise similar to the PoE-enabled PD 34$_1$.

The next-highest-priority PoE-enabled PD 34$_3$ (not shown in FIG. 3) includes an auxiliary-power input node 54$_3$ coupled to the power-output node 58$_2$ of the PoE-enabled PD 34$_2$, includes one Ethernet node 563 (hereinafter "node") configured to receive a combined signal including a third power signal, and is otherwise similar to the PoE-enabled PDs 34$_1$ and 34$_2$.

And the next-highest-priority PoE-enabled PDs 34$_4$-34$_{n-1}$ (not shown in FIG. 3) are each similar to the PoE-enabled PDs 34$_1$-34$_3$.

The lowest-priority PoE-enabled PD 34$_n$ includes an auxiliary-power input node 54$_n$ coupled to the power-output node 58$_{n-1}$ (not shown in FIG. 3) of the PoE-enabled PD 34$_{n-1}$ (not shown in FIG. 3), includes one Ethernet node 56$_n$ (hereinafter "node") configured to receive a combined signal including an $n^{th}$ power signal, includes a power-output node 58$_n$ configured to provide a power signal to an input node 70 of the power-supply circuit 50, and is otherwise similar to the PoE-enabled PDs 34$_1$-34$_{n-1}$.

And the power-supply circuit 50 is configured to receive the auxiliary power signal, or an extracted power signal from a PSE 14 (FIG. 1), on an input node 70, and to generate at least one regulated supply signal, here a regulated supply voltage $V_{DD}$, on an output node 72 in response to the power signal on the input node.

Referring to FIGS. 1-3, operation of the highest-priority PoE-enabled PD 34$_1$ of FIG. 3 is described according to an embodiment in which the PD 34$_1$ is coupled to a PSE 14, it being understood that the other PoE-enabled PDs 34$_2$-34$_n$ operate in a similar manner while they are coupled to a PSE.

The PSE 14 polls the PoE-enabled PD 34$_1$ via the Ethernet node 56$_1$ to determine whether the subsystem 30 is a device that is configured to receive Power over Ethernet. For example, the PoE-enabled PD 34$_1$ may include a polling impedance that the PSE 14 measures to determine whether the subsystem 30 is a PoE subsystem.

If the PSE 14 determines that the subsystem 30 is not a PoE subsystem, then the PSE does not provide a first power signal to the Ethernet node 56$_1$.

But if the PSE 14 determines that the subsystem 30 is a PoE subsystem, then the PSE provides, via the Ethernet node 56$_1$, a signal that indicates the maximum power that the PSE is configured to provide to the subsystem. For example, this signal is such that it provides enough power, via the voltage-extracting circuit 60$_1$, to operate the interface controller circuit 62$_1$.

Next, the PSE 14 generates a first power signal, which arrives at the Ethernet node 56$_1$ as a component of a combined power-and-data signal as described above in conjunction with FIG. 1, and the active diode bridge that forms the voltage-extraction circuit 60$_1$ extracts the first power signal from the combined power-and-data signal and provides the extracted first power signal to the interface controller 62$_1$ and to the transistor 66$_1$, which is inactive ("off," non-conducting).

Then, the interface controller 62$_1$ provides to the control circuit 40 (FIG. 2), via the available-power node 68$_1$, a signal that represents the available power that the PSE 14 is configured to provide to the subsystem 30 via the PoE-enabled PD 34$_1$.

In response to an auxiliary-power signal on the auxiliary-power input node 54$_1$, the interface controller 62$_1$ turns off the transistor 66$_1$ such that the transistor uncouples the extracted first power signal generated by the voltage-extraction circuit 60$_1$ from the power-signal output node 58$_1$. As further described below, this operation allows the auxiliary power signal on the terminal 52 to "feed" the input node 70 of the power supply 50 such that an auxiliary power source (not shown in FIG. 3), not a PSE, provides power to the subsystem 30.

The control circuit 40 (FIG. 2), in response to the interface controller circuit 62$_1$ having turned "off" the transistor 66$_1$, effectively ignores the signal from the node 68$_1$ indicating the available power that the PSE 14 can provide to the subsystem 30.

Conversely, in response to no auxiliary-power signal on the auxiliary-power input node 54$_1$, the interface controller 62$_1$ turns "on" the transistor 66$_1$ such that the transistor couples the extracted first power signal generated by the voltage-generator circuit 60$_1$ to the power-signal output node 58$_1$. As further described below, this operation allows the extracted first power signal from the PSE 14 coupled to the PoE-enabled PD 34$_1$ to "feed" the input node 70 of the power supply 50 such that the PSE powers the subsystem 30.

The control circuit 40 (FIG. 2), in response to the interface controller circuit 62$_1$ having turned "on" the transistor 66$_1$, analyzes the signal from the node 68$_1$ indicating the available power that the PSE 14 can provide to the subsystem 30. If the subsystem 30 is already configured such that the maximum power that the subsystem will consume during operation is no more than the available power that the PSE 14 can provide, then the control circuit 40 enables the subsystem to begin operation. But if the subsystem 30 is configured such that the maximum power that the subsystem will consume during operation is greater than the available power that the PSE can provide, then the control circuit 40 reconfigures the subsystem to operate at a maximum power that is no greater than the available power that the PSE can provide. For example, to reconfigure the subsystem 30 to operate in a lower-power mode, the control circuit may reduce the operating power of, or may disable, one or more of the radio modules 36 (FIG. 2).

Still referring to FIG. 3, operation of the interface circuit 32 is described according to an embodiment.

In a first example, an auxiliary power source (not shown in FIG. 3) generates an auxiliary power signal (e.g., an auxiliary voltage), on the terminal 52.

The auxiliary power signal, therefore, propagates through each of the diodes $64_1$-$64_n$ such that, ignoring the diodes' forward-biased voltage drops, the auxiliary power signal appears on the auxiliary-power input nodes $54_1$-$54_n$ of all of the PoE-enabled PDs $34_1$-$34_n$.

Consequently, the auxiliary power signal effectively disables each of the PoE-enabled PDs $34_1$-$34_n$ from coupling a respective extracted PSE power signal to the respective power-signal output node 58 such that the power supply 50 generates the regulated supply voltage $V_{DD}$ in response to only the auxiliary power signal. Because all of the PoE-enabled PDs $34_1$-$34_n$ are effectively disabled, the control circuit 40 (FIG. 3) effectively realizes that the available-power signals from the interface controllers $62_1$-$62_n$ are not needed to power the subsystem 30 (FIG. 2), and allows the subsystem 30 to operate as configured.

In a second example, no auxiliary power signal is on the terminal 52, but a PSE coupled to the Ethernet node $56_1$ provides a first power signal to the PoE-enabled PD $34_1$.

Because there is no signal on the auxiliary-power input node $54_1$ of the PoE-enabled PD $34_1$, the interface controller circuit $62_1$ turns the transistor $66_1$ "on" such that the transistor couples the extracted first power signal from the voltage-extraction circuit $60_1$ to the power-signal output node $58_1$.

The extracted first power signal, therefore, propagates through each of the diodes $64_2$-$64_n$ such that, ignoring the diodes' forward-biased voltage drops, the extracted first power signal appears on the auxiliary-power input nodes $54_2$-$54_n$ of all of the PoE-enabled PDs $34_2$-$34_n$.

Consequently, the extracted first power signal effectively disables each of the PoE-enabled PDs $34_2$-$34_n$ from coupling a respective extracted PSE power signal to the respective power-signal output node 58 such that the power supply 50 generates the regulated supply voltage $V_{DD}$ in response to only the extracted first power signal. Because all of the PoE-enabled PDs $34_2$-$34_n$ are effectively disabled, the control circuit 40 (FIG. 3) effectively ignores all available-power signals from the interface controllers $62_2$-$62_n$ and responds only to the available-power signal from the interface controller $62_1$ of the highest-priority PoE-enabled PD $34_1$ that is coupled to a PSE. If the available-power signal from the PoE-enabled PD $34_1$ indicates that the PSE providing the first power signal is configured to provide enough power for the subsystem 30 (FIG. 2) to operate as configured, then the controller 40 enables the subsystem for operation as configured; but if the available-power signal indicates that the PSE providing the first power signal is not configured to provide enough power for the subsystem 30 (FIG. 2) to operate as configured, then the controller 40 reconfigures the subsystem in a lower-power mode as described above, and enables the subsystem for operation as so reconfigured.

In a third example, no auxiliary power signal is on the terminal 52, no first power signal is on the Ethernet node $56_1$ of the highest-priority PoE-enabled PD $34_1$, but a PSE coupled to the Ethernet node $56_2$ provides a second power signal to the next-highest-priority PoE-enabled PD $34_2$.

Because there is no auxiliary-power signal on the auxiliary-power input node $54_1$ of the PoE-enabled PD $34_1$, and because there is no first power signal on the Ethernet node $56_1$ of the PoE-enabled PD $34_1$, there is no extracted first power signal on the auxiliary-power input node $54_2$ of the PoE-enabled PD $34_2$.

Therefore, the interface controller circuit $62_2$ turns the transistor $66_2$ "on" such that the transistor couples the extracted second power signal from the voltage-extraction circuit $60_2$ to the power-signal output node $58_2$.

The extracted second power signal, therefore, propagates through each of the diodes $64_3$-$64_n$ such that, ignoring the diodes' forward-biased voltage drops, the extracted second power signal appears on the auxiliary-power input nodes $54_3$-$54_n$ of all of the PoE-enabled PDs $34_3$-$34_n$.

Consequently, the extracted second power signal effectively disables each of the PoE-enabled PDs $34_3$-$34_n$ from coupling a respective extracted PSE power signal to the respective power-signal output node 58 such that the power supply 50 generates the regulated supply voltage $V_{DD}$ in response to only the extracted second power signal. Because all of the PoE-enabled PDs $34_3$-$34_n$ are effectively disabled, the control circuit 40 (FIG. 3) effectively ignores all available-power signals from the interface controllers $62_3$-$62_n$ and responds only to the available-power signal from the interface controller $62_2$ of the highest-priority PoE-enabled PD $34_2$ that is coupled to a PSE—in this example, the PoE-enabled PD $34_1$ is not coupled to a PSE and, therefore, does not generate an available-power signal on the node $68_1$. If the available-power signal from the PoE-enabled PD $34_2$ indicates that the PSE providing the second power signal is configured to provide enough power for the subsystem 30 (FIG. 2) to operate as configured, then the controller 40 enables the subsystem for operation as configured; but if the available-power signal indicates that the PSE providing the second power signal is not configured to provide enough power for the subsystem 30 (FIG. 2) to operate as configured, then the controller 40 reconfigures the subsystem in a lower-power mode as described above, and enables the subsystem for operation as so reconfigured.

The above three examples illustrate how the interface circuit 32 is configured such that if an auxiliary power source (not shown in FIG. 3) is coupled to the subsystem 30 (FIG. 2), then the interface circuit provides only the auxiliary power signal to the power supply 50, and such that if there is no auxiliary power, then the interface circuit provides, to the power supply, only the extracted power signal from the highest-priority PoE-enabled PD 34 that receives a power signal from a PSE.

Still referring to FIGS. 1-3, operation of the interface circuit 32 and of the controller 40 are described during a swap, or cross over, of the subsystem 30 from being powered by one PSE 14 to being powered by another PSE.

In an example, at a given time, no auxiliary power source is coupled to the terminal 52, a first PSE 14 is coupled to the PoE-enabled PD $34_1$, and a second PSE is coupled to the PoE-enabled PD $34_2$.

As described above, because the PoE-enabled PD $34_1$ has a higher priority than the PoE-enabled PD $34_2$, the PoE-enabled PD $34_1$ provides, to the input node 70 of the power supply 50, the first power signal extracted from the first PSE 14, and the control circuit 40 enables the subsystem 30 after reconfiguring the subsystem, if needed, to operate within the power available from the first PSE.

But the control circuit 40 stores, in a memory (not shown in FIGS. 1-3), the available powers of the first and second PSEs even after enabling the subsystem 30 for operation.

At some later time, the first PSE 14 stops sourcing the first power signal.

In response to the absence of the first power signal, the interface controller $62_1$ of the PoE-enabled PD $34_1$ deactivates the transistor $66_1$ by transitioning the control signal on the transistor's control node to an inactive level.

The control circuit 40 detects the transition, to an inactive level, of the control signal to the transistor $66_1$, and disables operation of the subsystem 30 by, for example, putting the subsystem into a sleep, or other lower-power, mode.

In response to the absence of the extracted first power signal on the power-signal output node $58_1$, the interface controller $62_2$ of the next-highest-priority PoE-enabled PD $34_2$ activates its transistor $66_2$ to couple the extracted second power signal from the voltage-extraction circuit $60_2$ to the power-signal output node $58_2$.

Therefore, as described above, because the PoE-enabled PD $34_2$ is now the highest-priority PD to which an active PSE 14 is coupled, the interface circuit 32 provides only the extracted second power signal from the power-signal output node $58_2$ to the input node 70 of the power supply 50.

Next, the control circuit 40 detects the transition of the control signal to the transistor $66_2$ and recognizes that the PoE-enabled PD $34_2$ is the highest-priority PD that is receiving a power signal from a PSE 14.

Then, the control circuit 40 retrieves, from a memory (not shown in FIGS. 1-3), the available power level of the PSE 14 coupled to the PoE-enabled PD $34_2$. If the maximum power consumption of the subsystem 30 in its current configuration is no more than the power available from the PSE 14 coupled to the PoE-enabled port $34_2$, then the controller 40 enables the subsystem for operation as configured; but if the maximum power consumption of the subsystem in its current configuration exceeds the power available from the PSE coupled to the PoE-enabled PD $34_2$, then the controller reconfigures the subsystem in a lower-power mode as described above, and enables the subsystem for operation as so reconfigured.

At some even later time, the first PSE 14 begins to source the first power signal again.

In response to the presence of the first power signal, the interface controller $62_1$ of the PoE-enabled PD $34_1$ activates the transistor $66_1$ by transitioning the control signal on the transistor's control node to an active level.

The control circuit 40 detects the transition, to an active level, of the control signal to the transistor $66_1$, and disables operation of the subsystem 30 by, for example, putting the subsystem into a sleep, or other lower-power, mode.

In response to the presence of the extracted first power signal on the power-signal output node $58_1$, the interface controller $62_2$ of the next-highest-priority PoE-enabled PD $34_2$ deactivates its transistor $66_2$ to uncouple, from the power-signal output node $58_2$, the extracted second power signal from the voltage-extraction circuit $60_2$.

Therefore, as described above, because the PoE-enabled PD $34_1$ is now again the highest-priority PD to which an active PSE 14 is coupled, the interface circuit 32 provides only the extracted first power signal from the power-signal output node $58_1$ to the input node 70 of the power supply 50.

Next, the control circuit 40 detects the transition of the control signal to the transistor $66_1$ and recognizes that the PoE-enabled PD $34_1$ is again the highest-priority port that is receiving a power signal from a PSE.

Then, the control circuit 40 retrieves, from a memory (not shown in FIGS. 1-3), the available power level of the PSE 14 coupled to the PoE-enabled PD $34_1$. If the maximum power consumption of the subsystem 30 in its current configuration is no more than the power available from the PSE 14 coupled to the PoE-enabled PD $34_1$, then the controller 40 enables the subsystem for operation as configured; but if the maximum power consumption of the subsystem in its current configuration exceeds the power available from the PSE coupled to the PoE-enabled PD $34_1$, then the controller reconfigures the subsystem in a lower-power mode as described above, and enables the subsystem for operation as so reconfigured.

The interface circuit 32 and the control circuit 40 can operate in a similar manner to swap between an auxiliary power source coupled to the terminal 52 and a PSE 14 coupled to one of the PoE-enabled PDs 34.

Referring to FIG. 3, alternate embodiments of the interface circuit 32 are contemplated. For example, the PoE-enabled PDs 34 need not be physically arranged in the order of their priorities. Furthermore, the interface circuit 32 may omit some of the above-described components, and may include components not described. Moreover, alternate embodiments described in conjunction with FIGS. 1-2 and 4-6 may be applicable to the interface circuit 32.

Figure 4:
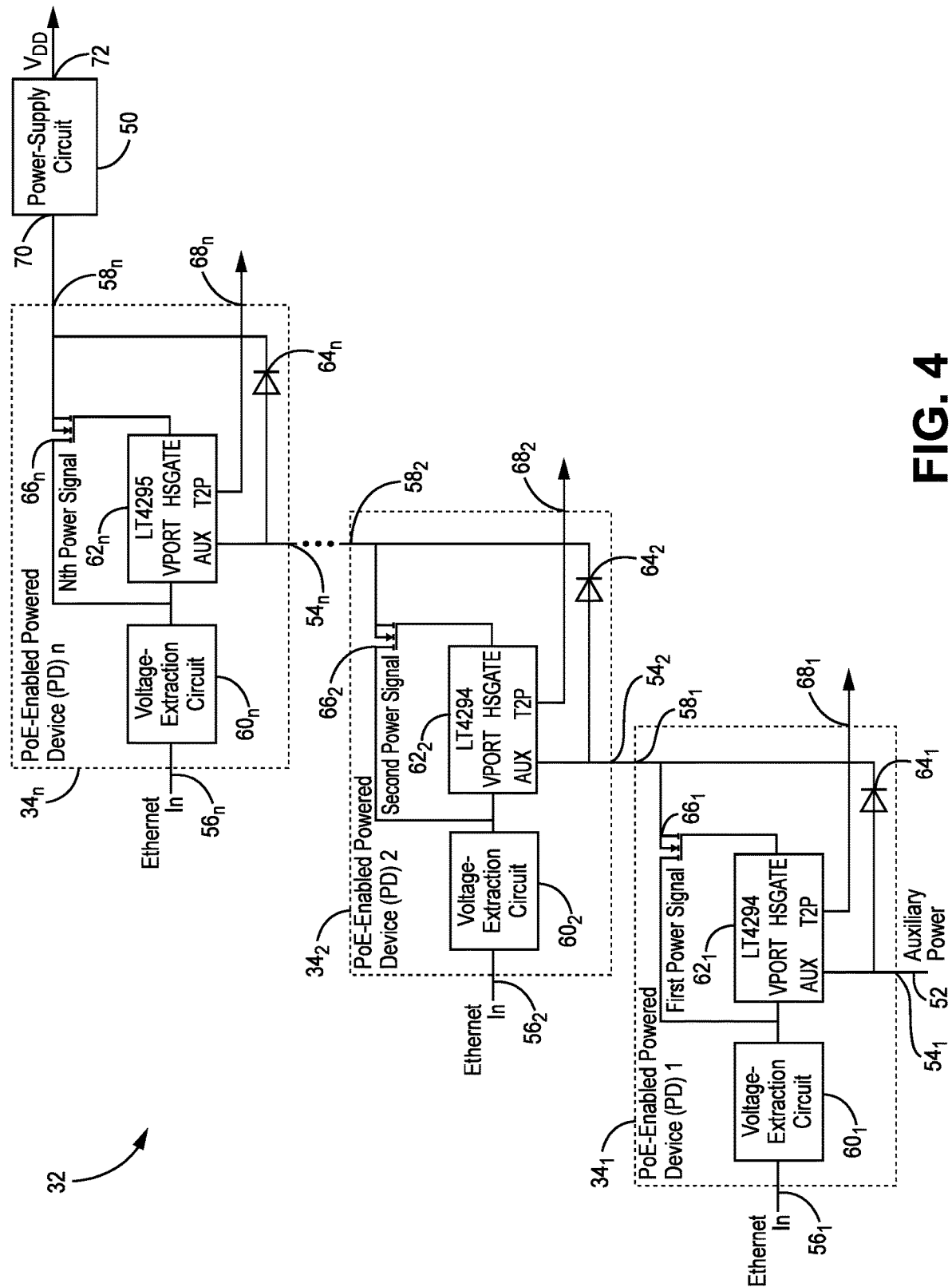
FIG. 4 is a diagram of the PD interface circuit of FIG. 2, according to another embodiment.

FIG. 4 is a diagram of the interface circuit 32 of the subsystem 30 of FIG. 2, according to another embodiment in which the interface controller circuits $62_1$-$62_{n-1}$ each include a respective Linear Technology LT4294 IEEE 802.3bt PD Interface Controller, and in which the interface controller circuit $62_n$ includes a Linear Technology LT4295 IEEE 802.3bt PD Interface with Forward/Flyback Controller. In FIG. 4, like numbers reference items common to FIGS. 3 and 4. Furthermore, at least for purposes of the below description, an LT4295 is similar in configuration and operation to an LT4294 except that the LT4295 is also configured for being the power-supply controller for the power supply 50 if the power supply is a flyback converter. The interface controller $62_n$ including an LT4295 instead of an LT4294 allows the subsystem 30 to omit a separate power-supply controller for the power supply 50. The data sheet (version 4294f) for an LT4294 is included herein as Appendix A, and the data sheet (version 4295f) for an LT4295 is included herein as Appendix B. Other than the interface controller circuits $62_1$— $62_n$ including LT4294 and LT4295 chips, respectively, the interface circuit 32 of FIG. 4 can be similar to the interface circuit 32 of FIG. 3.

Still referring to FIG. 4, alternate embodiments are contemplated for the interface circuit 32. For example, alternate embodiments described in conjunction with FIGS. 1-3 and 5-6 may be applicable to the interface circuit 32 of FIG. 4.

Figure 5:
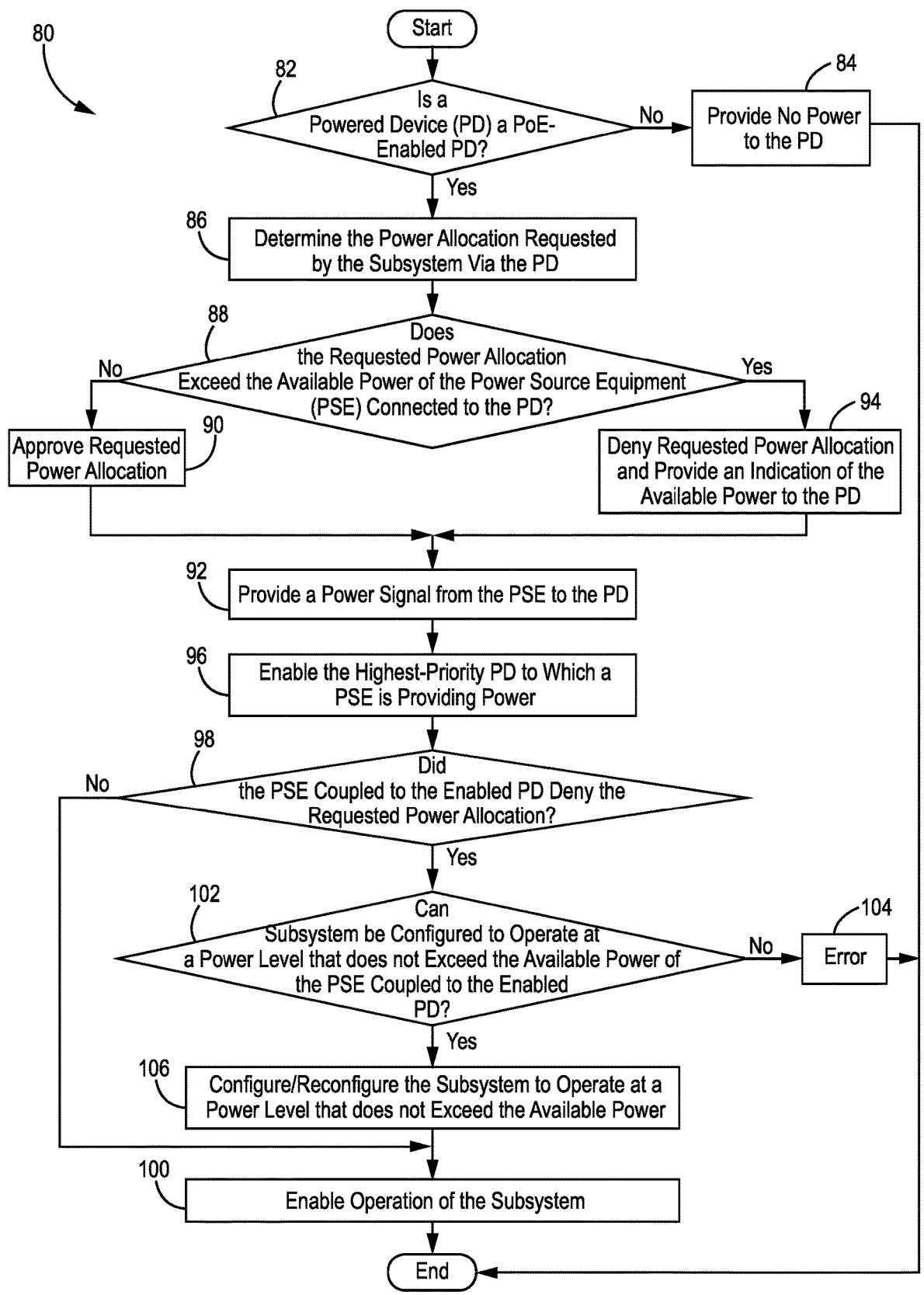
FIG. 5 is flow diagram of a procedure for powering a subsystem, such as the subsystem of FIG. 2, via a PoE-enabled PD, according to an embodiment.

FIG. 5 is a flow diagram 80 of the operation of the PSEs 14 of FIG. 1, the interface circuit 32 of FIGS. 2-4, and the control circuit 40 of FIG. 2, according to an embodiment. In the below operational description, it is assumed that, unless otherwise noted, the one or more hosts 12 (FIG. 1) are providing no data to the subsystem 30, in which case the PSE signals routed to the respective PoE-enabled PDs 34 by the respective combiners 16 have no data components. Furthermore, for shorthand, the below description may refer to a PSE 14 providing a signal to a respective PoE-enabled PD 34 without mentioning the routing of the signal through a respective combiner 16.

Referring to FIGS. 1-5, at a first step 82 of the flow diagram 80, each PSE 14 coupled to respective PD 34 of the subsystem 30 determines whether the respective PD is configured to provide power from the PSE to the subsystem;

that is, each PSE 14 coupled to a respective PD 34 determines whether the respective PD is PoE enabled. For example, where an interface control circuit 62 is an LT4294 or LT4295, to determine whether the corresponding PD 34 is configured to provide power to the subsystem 30, a PSE 14 "looks" for a 25 kΩ signature resistance (internal to the LT4294 or LT4295) coupled to the node VPORT by applying a detection voltage to VPORT and measuring the current into VPORT, as described on p. 6 of Appendix A.

Each PSE 14 that determines that the respective PD 34 is not configured to provide power to the subsystem 30 (i.e., determines that the respective PD is not PoE enabled) proceeds to a step 84, and provides no power to the respective PD.

But each PSE 14 that determines that the respective PD 34 is configured to provide power to the subsystem 30 (i.e., is PoE enabled) proceeds to a step 86.

At the step 86, each PSE 14 determines the power allocation that the subsystem 30 requests. For example, where an interface control circuit 62 is an LT4294 or LT4295, to determine the power-allocation request, i.e., the class, of the subsystem 30, a PSE issues one or more class/mark voltages/events to the node VPORT, and measures the one or more currents (one current per class/mark voltage/event) into VPORT as described on pp. 6-8 of Appendix A.

At a step 88, each PSE 14 determines whether the power allocation that the subsystem 30 requested exceeds the available power that the PSE can provide to the subsystem.

If, at the step 88, a PSE 14 determines that the power allocation that the subsystem 30 requested does not exceed the available power that the PSE can provide to the subsystem, then the PSE proceeds to a step 90.

At the step 90, the PSE 14 effectively approves the power-allocation request, and then proceeds to a step 92, at which the PSE provides power, in the form of a power signal, to the respective PoE-enabled PD 34 to which the PSE is coupled. For example, if the interface controller circuit 62 to which the PSE 14 is coupled is an LT4294 or LT4295, then the PSE generates, and provides to the respective Ethernet node 56, a power signal. The voltage generator 60 extracts the power signal from the node 56 (e.g., the voltage generator extracts a DC power signal by half-wave or full-wave rectifying the AC power signal from the PSE 14), and provides the extracted power signal to the node VPORT of the respective interface controller 32 and to the respective transistor 66.

If, however, at the step 88 a PSE 14 determines that the power allocation that the subsystem 30 requested exceeds the available power that the PSE can provide to the subsystem, then the PSE proceeds to a step 94.

At the step 94, the PSE 14 effectively denies the power-allocation request and provides, to the controller circuit 40 via the respective Ethernet node 56, voltage-extraction circuit 60, and available-power node 68 of the respective interface controller circuit 62, an indication of the PSE's available power. For example, if the interface controller circuit 62 to which the PSE 14 is coupled is an LT4294 or LT4295, then the PSE generates, and provides to the respective voltage-extraction circuit 60, one or more class/mark voltages/events to "demote" the subsystem 30 to a power allocation that is within the range of power that the PSE can provide to the subsystem, as described on pp. 7-8 of Appendix A. The respective voltage-extraction circuitry 60 extracts the class/mark voltages/events, and provides the extracted class/mark voltages/events to the node VPORT of the LT4294 or LT4295 interface controller 62. And the LT4294 or LT4295 interface controller 62 provides to the controller 40, via the $\overline{T2P}$ node 68, a signal that represents the available power allocation of the PSE 14 as described on p. 10, Tables 3-5, of Appendix A.

From step 94, the PSE 14 proceeds to the step 92, at which the PSE provides power to the respective PoE-enabled PD 34 in the form of a power signal, where the amount of power available from the PSE is the power level to which the PSE demoted the subsystem 30.

At a step 96, the interface circuit 32 enables only the highest-priority PoE-enbabled PD 34 to which a PSE is providing a power signal in a manner described above in conjunction with FIGS. 2-3. That is, the interface circuit 32 couples, to the input node 70 of the power supply 50, the power signal from only the PSE 14 that is coupled to the PoE-enabled PD 34 having the highest priority among the PoE-enabled PDs to which PSEs are coupled.

At a step 98, the control circuit 40 determines whether the PSE 14 coupled to the enabled PD 34 demoted the subsystem 30 to a lower power level. If the control circuit 40 determines that the PSE 14 coupled to the enabled PD 34 did not demote the subsystem 30 to a lower power level, then the control circuit proceeds to a step 100. But if the control circuit 40 determines that the PSE 14 coupled to the enabled PD 34 demoted the subsystem 30 to a lower power level, then the control circuit proceeds to a step 102.

At the step 102, the control circuit 40 determines whether the subsystem 30 can be configured to operate at the demoted power level. If the control circuit 40 determines that the subsystem 30 cannot be configured to operate at the demoted power level, then the control circuit proceeds to a step 104, at which the controller circuit 40 executes an error routine without enabling operation of the subsystem 30. But if the control circuit 40 determines that the subsystem 30 can be configured to operate at the demoted power level, then the control circuit proceeds to a step 106.

At the step 106, the control circuit 40 reconfigures the subsystem 30 to operate at the demoted power level, and then proceeds to the step 100.

At the step 100, the control circuit 40 enables operation of the subsystem 30 in its current power configuration.

If, during operation of the subsystem 30, the PSE 14 powering the subsystem fails, or otherwise ceases to provide a power signal to the subsystem, then the interface circuit 32 and the control circuit 40 operate, as described above in conjunction with FIG. 3, to enable the subsystem to receive power from the PSE coupled to the PoE-enabled PD 34 having the next-highest priority.

Still referring to FIG. 5, alternate embodiments of the operation of the one or more PSEs 14, interface circuit 32, and control circuit 40 are contemplated. For example, some of the steps described in conjunction with the flow diagram 80 can be omitted. Furthermore, steps not described in conjunction with the flow diagram 80 may nevertheless be part of the procedure described in conjunction with the flow diagram. Moreover, alternate embodiments described in conjunction with FIGS. 1-4 and 6 may be applicable to the one or more embodiments described in conjunction with FIG. 5.

Figure 6:
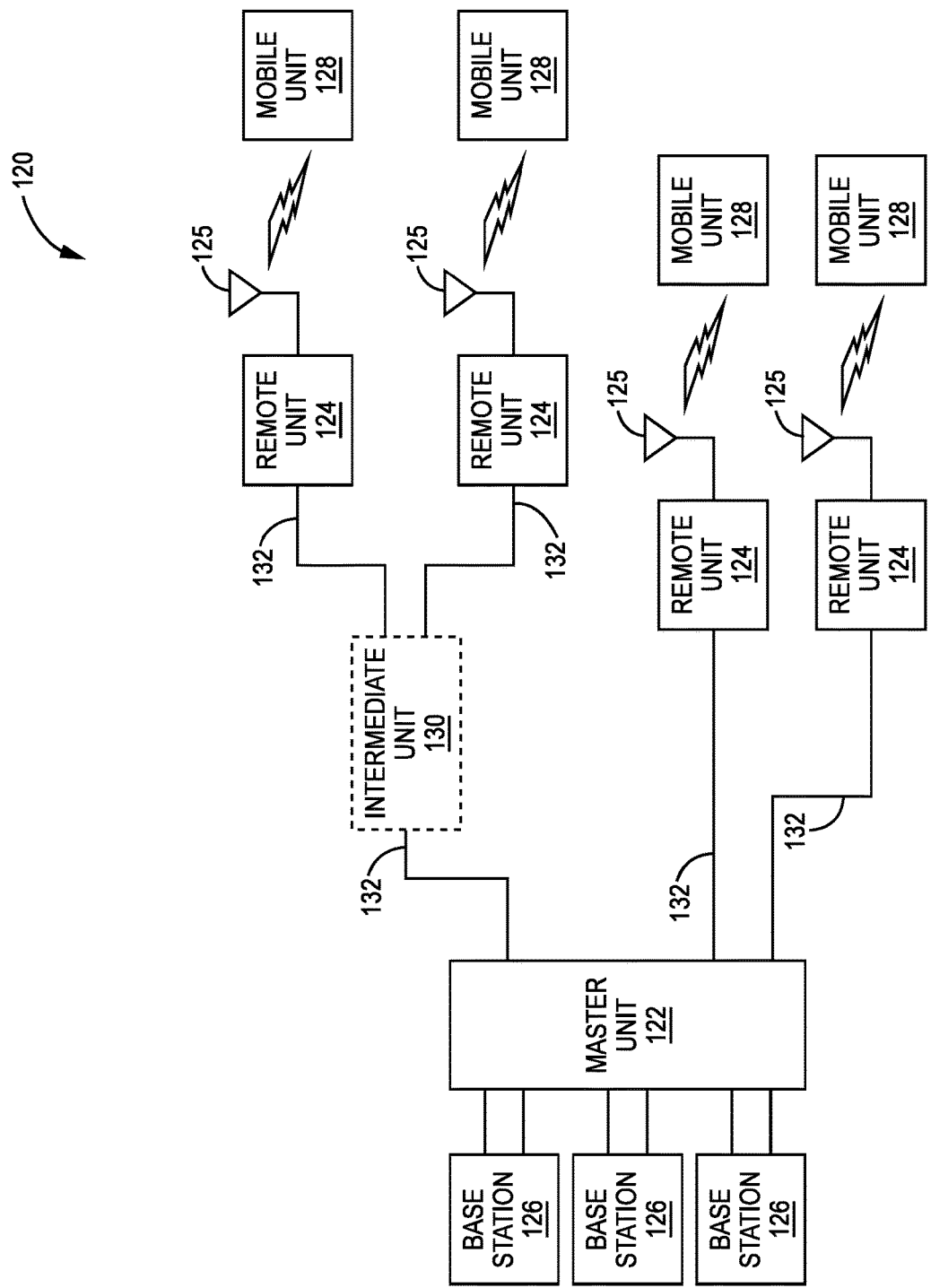
FIG. 6 is a diagram of a distributed-antenna system (DAS) that includes one or more of subsystems of FIG. 2, according to an embodiment.

FIG. 6 is a block diagram of a distributed antenna system (DAS) 120, which can include one or more of the subsystems 30 of FIG. 2, according to an embodiment. In the described example, at least one of the remote units 124 of the DAS 120 is, or includes, at least one subsystem 30 of FIG. 2.

The DAS 120 includes one or more master units 122 and one or more remote units 124 that are communicatively coupled to the master units 122. Further in this embodiment, the DAS 120 includes a digital DAS, in which DAS traffic is distributed between the master units 122 and the remote units 124 in digital form. In other embodiments, the DAS 120 is implemented, at least in part, as an analog DAS, in which DAS traffic is distributed at least part of the way between the master units 122 and the remote units 124 in analog form.

Each master unit 122 is communicatively coupled to one or more base stations 126. One or more of the base stations 126 can be co-located with the respective master unit 122 to which it is coupled (for example, where the base station 126 is dedicated to providing base station capacity to the DAS 120). Also, one or more of the base stations 126 can be located remotely from the respective master unit 122 to which it is coupled (for example, where the base station 126 is a macro base station providing base station capacity to a macro cell in addition to providing capacity to the DAS 120). In this latter case, a master unit 122 can be coupled to a donor antenna in order to wirelessly communicate with the remotely located base station 126.

The base stations 126 can be implemented as traditional monolithic base stations. Also, the base stations 126 can be implemented using a distributed base station architecture in which a base band unit (BBU) is coupled to one or more remote radio heads (RRHs), where the front haul between the BBU and the RRH uses streams of digital IQ samples. Examples of such an approach are described in the Common Public Radio Interface (CPRI) and Open Base Station Architecture Initiative (OBSAI) families of specifications.

The master units 122 can be configured to use wideband interfaces or narrowband interfaces to the base stations 126. Also, the master units 122 can be configured to interface with the base stations 126 using analog radio frequency (RF) interfaces or digital interfaces (for example, using a CPRI or OBSAI digital IQ interface).

Traditionally, each master unit 122 interfaces with each base station 126 using the analog radio frequency signals that each base station 126 communicates to and from mobile units 128 using a suitable air interface standard. The DAS 120 operates as a distributed repeater for such radio frequency signals. RF signals transmitted from each base station 126 (also referred to herein as "downlink RF signals") are received at one or more master units 122. Each master unit 122 uses the downlink RF signals to generate a downlink transport signal that is distributed to one or more of the remote units 124. Each such remote unit 124 receives the downlink transport signal and reconstructs a version of the downlink RF signals based on the downlink transport signal and causes the reconstructed downlink RF signals to be radiated from at least one antenna array 125 (e.g., at least one array of the antennas 38 of FIG. 2) coupled to or included in that remote unit 124.

A similar process is performed in the uplink direction. RF signals transmitted from mobile units 128 (also referred to herein as "uplink RF signals") are received at one or more remote units 124. Each remote unit 124 uses the uplink RF signals to generate an uplink transport signal that is transmitted from the remote unit 124 to a master unit 122. Each master unit 122 receives uplink transport signals transmitted from one or more remote units 124 coupled to it. The master unit 122 combines data or signals communicated via the uplink transport signals received at the master unit 122 and reconstructs a version of the uplink RF signals received at the remote units 124. The master unit 122 communicates the reconstructed uplink RF signals to one or more base stations 126. In this way, the coverage of the base stations 126 can be expanded using the DAS 120.

One or more intermediate units 130 (some of which are also referred to here as "expansion units" 130) can be placed between the master units 122 and one or more of the remote units 124. This can be done, for example, in order to increase the number of remote units 124 that a single master unit 122 can feed, to increase the master-unit-to-remote-unit distance, and/or to reduce the amount of cabling needed to couple a master unit 122 to its associated remote units 124.

As noted above, the DAS 120 is implemented as a digital DAS. In a "digital" DAS, signals received from and provided to the base stations 126 and mobile units 128 are used to produce digital in-phase (I) and quadrature (Q) samples, which are communicated between the master units 122 and remote units 124. It is important to note that this digital IQ representation of the original signals received from the base stations 126 and from the mobile units 128 still maintains the original modulation (that is, the change in the amplitude, phase, or frequency of a carrier) used to convey telephony or data information pursuant to the cellular air interface protocol used for wirelessly communicating between the base stations 126 and the mobile units 128. Examples of such cellular air interface protocols include, for example, the Global System for Mobile Communication (GSM), Universal Mobile Telecommunications System (UMTS), High-Speed Downlink Packet Access (HSDPA), and Long-Term Evolution (LTE) air interface protocols. Also, each stream of digital IQ samples represents or includes a portion of wireless spectrum. For example, the digital IQ samples can represent a single radio access network carrier (for example, a UMTS or LTE carrier of 5 MHz) onto which voice or data information has been modulated using a UMTS or LTE air interface. However, it is to be understood that each such stream can also represent multiple carriers (for example, in a band of frequency spectrum or a sub-band of a given band of frequency spectrum).

Furthermore, one or more of the master units 122 are configured to interface with one or more base stations 126 using an analog RF interface (for example, either a traditional monolithic base station 126 or via the analog RF interface of an RRH). The base stations 126 can be coupled to the master units 122 using a network of attenuators, combiners, splitters, amplifiers, filters, cross-connects, etc., (sometimes referred to collectively as a "point-of-interface" or "POI"). This is done so that, in the downstream, the desired set of RF carriers output by the base stations 126 can be extracted, combined, and routed to the appropriate master unit 122, and so that, in the upstream, the desired set of carriers output by the master unit 122 can be extracted, combined, and routed to the appropriate interface of each base station 126.

Each master unit 122 can produce digital IQ samples from an analog wireless signal received at radio frequency (RF) by down-converting the received signal to an intermediate frequency (IF) or to baseband, digitizing the down-converted signal to produce real digital samples, and digitally down-converting the real digital samples to produce digital in-phase (I) and quadrature (Q) samples. These digital IQ samples can also be filtered, amplified, attenuated, and/or re-sampled or decimated to a lower sample rate. The digital samples can be produced in other ways. Each stream of digital IQ samples represents a portion of wireless radio frequency spectrum output by one or more base stations 126. Each portion of wireless radio frequency spectrum can include, for example, a band of wireless spectrum, a subband of a given band of wireless spectrum, or an individual wireless carrier.

Likewise, in the upstream, each master unit 122 can produce an upstream analog wireless signal from one or more streams of digital IQ samples received from one or more remote units 124 by digitally combining streams of digital IQ samples that represent the same carriers or frequency bands or sub-bands (for example, by digitally summing such digital IQ samples), digitally up-converting the combined digital IQ samples to produce real digital samples, performing a digital-to-analog process on the real samples in order to produce an IF or baseband analog signal, and up-converting the IF or baseband analog signal to the desired RF frequency. The digital IQ samples can also be filtered, amplified, attenuated, and/or re-sampled or interpolated to a higher sample rate, before and/or after being combined. The analog signal can be produced in other ways (for example, where the digital IQ samples are provided to a quadrature digital-to-analog converter that directly produces the analog IF or baseband signal).

One or more of the master units 122 can be configured to interface with one or more base stations 126 using a digital interface (in addition to, or instead of) interfacing with one or more base stations 126 via an analog RF interface. For example, the master unit 122 can be configured to interact directly with one or more BBUs using the digital IQ interface that is used for communicating between the BBUs and an RRHs (for example, using the CPRI serial digital IQ interface).

In the downstream, each master unit 122 terminates one or more downstream streams of digital IQ samples provided to it from one or more BBUs and, if necessary, converts (by re-sampling, synchronizing, combining, separating, gain adjusting, etc.) them into downstream streams of digital IQ samples compatible with the remote units 124 used in the DAS 120. In the upstream, each master unit 122 receives upstream streams of digital IQ samples from one or more remote units 124, digitally combining streams of digital IQ samples that represent the same carriers or frequency bands or sub-bands (for example, by digitally summing such digital IQ samples), and, if necessary, converts (by re-sampling, synchronizing, combining, separating, gain adjusting, etc.) them into upstream streams of digital IQ samples compatible with the one or more BBUs that are coupled to that master unit 122.

Each master unit 122 can be implemented in other ways.

In the downstream, each remote unit 124 receives streams of digital IQ samples from one or more master units 122, where each stream of digital IQ samples represents a portion of wireless radio frequency spectrum output by one or more base stations 126.

Each remote unit 124 is communicatively coupled to one or more master units 122 using one or more ETHERNET-compatible cables 132 (for example, one or more CAT-6A cables). In this embodiment, each remote unit 124 can be directly connected to a master unit 122 via a single ETHERNET cable 132 or indirectly via multiple ETHERNET-compatible cables 132 such as where a first ETHERNET cable 132 connects the remote unit 124 to a patch panel or expansion/intermediate unit 130 and a second optical fiber cable 132 connects the patch panel or expansion/intermediate unit 130 to the master unit 122. Each remote unit 124 can be coupled to one or more master units 122 in other ways. And the master unit 122 or expansion/intermediate unit(s) 130 can include one or more PSEs 14 (FIG. 1) that are configured to provide power to the remote units 124 as described above in conjunction with FIGS. 2-5.

The methods and techniques described herein may be implemented in analog electronic circuitry, digital electronic circuitry, or with a programmable processor (for example, a special-purpose processor, a general-purpose processor such as a computer, a microprocessor, or microcontroller) firmware, software, or in combinations of them. Apparatuses embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

EXAMPLE EMBODIMENTS

Example 1 includes an interface circuit, comprising: a first powered device port configured to receive, and to couple to a power supply, a first power signal; and a second powered device configured to receive a second power signal, to couple the second power signal to the power supply, and to prevent the first powered device from coupling the first power signal to the power supply while the second powered device is coupling the second power signal to the power supply.

Example 2 includes the interface circuit of Examples 1 wherein at least one of the first powered device and the second powered device includes a respective Ethernet powered device.

Example 3 includes the interface circuit of any of Examples 1-2 wherein the first powered device is configured: to receive a combined signal including a data signal superimposed on the first power signal; and to extract the first power signal from the combined signal.

Example 4 includes the interface circuit of any of Examples 1-3 wherein the second powered device is configured: to receive a combined signal including a data signal superimposed on the second power signal; and to extract the second power signal from the combined signal.

Example 5 includes the interface circuit of any of Examples 1~4 wherein the second powered device is configured to prevent the first powered device from coupling the first power signal to the power supply by disabling the first powered device from coupling the first power signal to the power supply.

Example 6 includes the interface circuit of any of Examples 1-5 wherein the second powered device is configured to prevent the first powered device from coupling the first power signal to the power supply by coupling the second power signal to a disable node of the first powered device.

Example 7 includes the interface circuit of any of Examples 1-6 wherein the second powered device is configured to prevent the first powered device from coupling the first power signal to the power supply by coupling the second power signal to an auxiliary-power node of the first powered device.

Example 8 includes the interface circuit of any of Examples 1-7 wherein the second powered device is configured to prevent the first powered device from coupling the first power signal to the power supply by configuring the first powered device to uncouple the first power signal from the power supply.

Example 9 includes the interface circuit of any of Examples 1-8, further comprising a third powered device configured: to receive a third power signal; to couple to the third power signal to the power supply; to prevent the first powered device from coupling the first power signal to the power supply while the third powered device is coupling the third power signal to the power supply; and to prevent the second powered device from coupling the second power signal to the power supply while the third powered device is coupling the third power signal to the power supply.

Example 10 includes the interface circuit of any of Examples 1-9, further comprising: a third powered device configured to receive a third power signal, and to couple to the third power signal to the power supply; wherein the first powered device is configured to prevent the third powered device from coupling the third power signal to the power supply while the first powered device is coupling the first power signal to the power supply; and wherein the second powered device is configured to prevent the third powered device from coupling the third power signal to the power supply while the second powered device is coupling the second power signal to the power supply.

Example 11 includes a subsystem, comprising: a power supply configured to generate a regulated supply signal in response to an input power signal; and an interface circuit, including a first powered device configured to receive, and to couple to the power supply as the input power signal, a first power signal, and a second powered device configured to receive a second power signal, to couple to the second power signal to the power supply as the input power signal, and to prevent the first powered device from coupling the first power signal to the power supply while the second powered device is coupling the second power signal to the power supply.

Example 12 includes the subsystem of Example 11 wherein: the regulated supply signal includes a regulated supply voltage; and the input power signal includes an input voltage.

Example 13 includes the subsystem of any of Examples 11-12, further comprising: operational circuitry; wherein the first powered device is configured to receive a first power capability of a first source of the first power signal; wherein the second powered device is configured to receive a second power capability of a second source of the second power signal; and a control circuit configured to configure the operational circuitry according to the first power capability in response to the first powered device providing the first power signal to the power supply, and to configure the operational circuitry according to the second power capability in response to the second powered device providing the second power signal to the power supply.

Example 14 includes the subsystem of any of Examples 11-13, further comprising: a radio module; wherein the first powered device is configured to receive a first power capability of a first source of the first power signal; wherein the second powered device is configured to receive a second power capability of a second source of the second power signal; and a control circuit configured to configure the radio module according to the first power capability in response to the first powered device providing the first power signal to the power supply, and to configure the radio module according to the second power capability in response to the second powered device providing the second power signal to the power supply.

Example 15 includes the subsystem of any of Examples 11-14, further comprising: radio modules; wherein the first powered device is configured to receive a first power capability of a first source of the first power signal; wherein the second powered device is configured to receive a second power capability of a second source of the second power signal; and a control circuit configured to disable at least one of the radio modules in response to the first powered device providing the first power signal to the power supply and in response to the first power capability indicating that the first source is unable to provide a level of power sufficient for operating all of the radio modules, and to disable at least one of the radio modules in response to the second powered device providing the second power signal to the power supply and in response to the second power capability indicating that the second source is unable to provide a level of power sufficient for operating all of the radio modules.

Example 16 includes a system, comprising: a first power source configured to generate a first power signal; a second power source configured to generate a second power signal; and a subsystem, including a power supply configured to generate a regulated supply signal in response to an input power signal, and an interface circuit, including a first powered device coupled to the first power source and configured to couple the first power signal to the power supply as the input power signal, and a second powered device coupled to the second power source and configured, in response to the second power signal, to couple the second power signal to the power supply as the input power signal, and to prevent the first powered device from coupling the first power signal to the power supply.

Example 17 includes the system of Example 16 wherein the second powered device is configured, in response to an absence of the second power signal, to allow the first powered device to couple the first power signal to the power supply.

Example 18 includes the system of any of Examples 16-17 wherein: the first power source is configured to provide, to the device, an indication of a first power level with which the first power source can power the device; the second power source is configured to provide, to the device, an indication of a second power level with which the second power source can power the device; the subsystem further includes a control circuit configured to configure the subsystem to operate at a power level no greater than the first power level in response to the first powered device coupling the first power signal to the power supply, and to configure the subsystem to operate a power level no greater than the second power level in response to the second powered device coupling the second power signal to the power supply.

Example 19 includes a method, comprising: receiving power signals at respective powered devices of a subsystem; coupling, to a power supply with the one of the powered devices having a highest priority, the one of the power signals received by the one of the powered devices; and generating a supply signal with the power supply in response to the one of the power signals.

Example 20 includes the method of Example 19, further comprising: receiving, for the one of the power signals received by the one of the powered devices having the highest priority, an indication of a power level that a source of the one of the power signals can provide; and configuring circuitry coupled to the power supply to consume no more power than approximately the power level.

Example 21 includes the method of any of Examples 19-20, further comprising: receiving, for the one of the power signals received by the one of the powered devices having the highest priority, an indication of a power level that a source of the one of the power signals can provide; and reducing a power consumption of circuitry coupled to the power supply in response to the indication of the power level.

Example 22 includes the method of any of Examples 19-21, further comprising: receiving, for the one of the power signals received by the one of the powered devices having the highest priority, an indication of a first power level that a source of the one of the power signals can provide; receiving, for another of the power signals received by another one of the powered devices, an indication of a second power level that a source of the other of the power signals can provide; and configuring circuitry coupled to the power supply to consume no more power than approximately the first power level.

Example 23 includes a method, comprising: receiving an indication of an available power that a power source coupled to a powered device can provide; and in response to the powered device having a higher priority than all other powered devices coupled to respective power sources determining whether circuitry is configured to operate at a power level that is greater than the available power, and reconfiguring the circuitry to operate at a power level that is less than, or approximately equal to, the available power in response to the circuitry being configured to operate at a power level that is greater than the available power, and enabling operation of the reconfigured circuitry.

Example 24 includes the method of Examples 23 wherein response to the powered device having a higher priority than all other powered devices coupled to respective power sources, enabling operation of the circuitry without reconfiguring the circuitry to operate at a different power level in response to the circuitry being configured to operate at a power level that is less than, or approximately equal to, the available power.

Example 25 includes a non-transitory, tangible computer-readable medium storing instructions that, when executed at least one computing circuit, cause the at least one computing circuit, or another circuit under control of the at least one computing circuit: receiving an indication of an available power that a power source coupled to a powered device can provide; and in response to receiving, at a powered device having a higher priority than all other powered devices coupled to respective power sources, an indication of an available power that a power source coupled to the powered device can provide determining whether circuitry is configured to operate at a power level that is greater than the available power, reconfiguring the circuitry to operate at a power level that is less than, or approximately equal to, the available power in response to the circuitry being configured to operate at a power level that is greater than the available power, and enabling operation of the reconfigured circuitry.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A method, comprising:
receiving power signals at respective powered devices of a subsystem, wherein each powered device is configured to receive power and data over a same cable;
wherein power outputs of each powered device, of the powered devices, are electrically connected to a power input of only one power supply;
coupling, to the power supply from only one of the powered devices having a highest priority of all of the powered devices, one of the power signals received by the one of the powered devices having the highest priority; and
generating a supply signal with the power supply in response to the one of the power signals.

2. The method of claim 1, further comprising:
receiving, for the one of the power signals received by the one of the powered devices having the highest priority, an indication of a power level that a source of the one of the power signals can provide; and
configuring circuitry coupled to the power supply to consume no more power than the power level.

3. The method of claim 1, further comprising:
receiving, for the one of the power signals received by the one of the powered devices having the highest priority, an indication of a power level that a source of the one of the power signals can provide; and
reducing a power consumption of circuitry coupled to the power supply in response to the indication of the power level.

4. The method of claim 1, further comprising:
receiving, for the one of the power signals received by the one of the powered devices having the highest priority, an indication of a first power level that a source of the one of the power signals can provide;
receiving, for another of the power signals received by another one of the powered devices, an indication of a second power level that a source of another of the power signals can provide; and
configuring circuitry coupled to the power supply to consume no more power than the first power level.

5. The method of claim 1, further comprising:
receiving, for the one of the power signals received by the one of the powered devices having the highest priority, an indication of a power level that a source of the one of the power signals can provide; and
disabling at least one radio module in response to the indication of the power level.

6. The method of claim 1, further comprising:
receiving, for the one of the power signals received by the one of the powered devices having the highest priority, an indication of a power level that a source of the one of the power signals can provide; and
reducing a frequency of a clock signal for a control circuit of the subsystem in response to the indication of the power level.

7. The method of claim 1, further comprising:
receiving an indication of an available power that a power source coupled to a first powered device can provide; and in response to the first powered device having a higher priority than all other powered devices coupled to respective power sources:
  determining whether circuitry is configured to operate at a power level that is greater than the available power,
  reconfiguring the circuitry to operate at a power level that is less than, or equal to, the available power in response to the circuitry being configured to operate at a power level that is greater than the available power, and
  enabling operation of the reconfigured circuitry.

8. The method of claim 7, further comprising enabling operation of the circuitry without reconfiguring the circuitry to operate at a different power level in response to the circuitry being configured to operate at a power level that is less than, or equal to, the available power.

9. The method of claim 1, wherein the respective powered devices of the subsystem includes Ethernet powered devices.

10. The method of claim 1, further comprising:
  receiving a combined signal including a data signal superimposed on a power signal; and
  extracting the power signal from the combined signal.

11. The method of claim 1, wherein receiving power signals at the respective powered devices of the subsystem includes receiving a first power signal at a first powered device and receiving a second power signal at a second powered device.

12. The method of claim 11, further comprising preventing, with the second powered device, the first powered device from coupling the first power signal to the power supply by coupling the second power signal to a node of the first powered device.

13. The method of claim 11, further comprising preventing, with the second powered device, the first powered device from coupling the first power signal to the power supply by disabling the first powered device from coupling the first power signal to the power supply.

14. The method of claim 11, further comprising preventing, with the second powered device, the first powered device from coupling the first power signal to the power supply by coupling the second power signal to a disable node of the first powered device.

15. The method of claim 11, further comprising preventing, with the second powered device, the first powered device from coupling the first power signal to the power supply by coupling the second power signal to an auxiliary-power node of the first powered device.

16. The method of claim 11, further comprising preventing, with the second powered device, the first powered device from coupling the first power signal to the power supply by configuring the first powered device to uncouple the first power signal from the power supply.

17. The method of claim 1, wherein receiving power signals at the respective powered devices of the subsystem includes receiving a first power signal at a first powered device, receiving a second power signal at a second powered device, and receiving a third power signal at a third powered device.

18. The method of claim 17, further comprising:
  preventing, with the third powered device, the first powered device from coupling the first power signal to the power supply while the third powered device is coupling the third power signal to the power supply; and
  preventing, with the third powered device, the second powered device from coupling the second power signal to the power supply while the third powered device is coupling the third power signal to the power supply.

19. The method of claim 17, further comprising:
  preventing, with the third powered device, the first powered device from coupling the first power signal to the power supply while the third powered device is coupling the third power signal to the power supply; and
  preventing, with the second powered device, the third powered device from coupling the second power signal to the power supply while the third powered device is coupling the third power signal to the power supply.

20. The method of claim 1, further comprising:
in response to the one of the power signals received by the one of the powered devices having the highest priority not being coupled to the power supply:
  coupling, to the power supply with a powered device having a second highest priority, a second power signal received by the powered device having the second highest priority; and
  generating the supply signal with the power supply in response to the second power signal.

* * * * *